(12) United States Patent
Rains et al.

(10) Patent No.: US 7,852,201 B2
(45) Date of Patent: Dec. 14, 2010

(54) APPARATUS AND METHOD FOR DETERMINING THE REMAINING USEFUL LIFE OF A TRANSMISSION FILTER

(75) Inventors: Mark A. Rains, Indianapolis, IN (US); Brett R. Caldwell, New Palestine, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 289 days.

(21) Appl. No.: 11/971,983

(22) Filed: Jan. 10, 2008

(65) Prior Publication Data

US 2008/0224838 A1 Sep. 18, 2008

Related U.S. Application Data

(60) Provisional application No. 60/895,012, filed on Mar. 15, 2007.

(51) Int. Cl.
*B60Q 1/00* (2006.01)

(52) U.S. Cl. ............... 340/438; 340/425.5; 340/439; 340/441; 340/445; 73/53.05; 73/114.43; 73/292; 701/29; 123/196 AB

(58) Field of Classification Search .......... 340/439, 340/441, 445, 425.5, 438; 73/53.05, 114.43, 73/292, 114.39, 115.02, 116.02, 117.02, 73/117.03, 118.01, 119 R; 123/196 AB; 116/28.1, DIG. 25, DIG. 42; 701/29
See application file for complete search history.

(56) References Cited

U.S. PATENT DOCUMENTS

| | | | | |
|---|---|---|---|---|
| 5,282,386 A | * | 2/1994 | Niemczyk et al. | 73/292 |
| 5,559,494 A | * | 9/1996 | Thompson | 340/439 |
| 6,504,474 B1 | * | 1/2003 | Goodnight et al. | 340/439 |
| 7,168,304 B2 | * | 1/2007 | Beaucaire et al. | 73/114.43 |
| 2007/0131193 A1 | * | 6/2007 | Takahashi | 123/196 AB |

* cited by examiner

*Primary Examiner*—George A Bugg
*Assistant Examiner*—Sisay Yacob
(74) *Attorney, Agent, or Firm*—Quinn Law Group, PLLC

(57) ABSTRACT

A vehicle has a transmission, a transmission filter, and a controller having an algorithm or method for predicting the remaining useful life of the filter. The algorithm or method uses a sensor to detect an operating event of the transmission, such as a completed shift event or zero transmission output speed event, and increases a stored value of an accumulated distance and time variable. A shift sensor is operable for comparing a detected speed ratio of the transmission to a stored threshold speed ratio for determining the completed shift event. The remaining useful filter life is predicted using one or more look up tables using the values of the accumulated distance and time variables. The accumulated distance is calculated in part by dividing a prior recorded accumulated distance value by a ratio of an output speed of the transmission to an actual vehicle speed.

11 Claims, 2 Drawing Sheets

APPARATUS AND METHOD FOR DETERMINING THE REMAINING USEFUL LIFE OF A TRANSMISSION FILTER

CLAIM OF PRIORITY

This application claims priority to U.S. Provisional Patent Application No. 60/895,012, filed on Mar. 15, 2007, which is hereby incorporated by reference in its entirety.

TECHNICAL FIELD

The present invention relates to an apparatus and method for predicting the remaining useful life of a fluid filter for a vehicle transmission.

BACKGROUND OF THE INVENTION

A vehicle transmission includes a fluid filter for preventing or minimizing the size and quantity of suspended particulates, debris, or other contaminants in a supply of transmission fluid that are ultimately brought into contact with the moving components of the transmission, where such debris could potentially affect the performance and operation of various moving valves, gears, or other critical components. Likewise, a transmission filter may prevent particulates that are generated within the transmission housing itself from exiting the transmission housing. Typical particulates or debris include metal chips, pieces, or shavings resulting from dynamic contact between the mating hard gears, fine friction material residue resulting from clutch plate wear at the friction interface, or other such debris from the various system components that make up the transmission or that conduct the transmission fluid.

A transmission filter typical is contained within an outer filter housing and must be cleaned, replaced, or otherwise properly maintained on a regular basis. Proper filter maintenance is necessary to ensure the efficient flow of transmission fluid through the media within the transmission, unimpeded by any excessive accumulation of debris within the filter element, i.e. the portion of the filter through which the fluid supply flow and is filtered. Also, proper filter maintenance is needed to ensure that the filter element itself does not prematurely rupture due to a build up of differential pressure or fluid back pressure due to excessive debris accumulation.

Periodic maintenance of the transmission filter is often performed on a scheduled maintenance basis, with recommended filter replacement usually stated on mileage basis, for example every 30,000 miles of travel or annually. However, scheduled maintenance may be less than optimal for some operators. For instance, scheduled maintenance may require the manual logging and tracking of odometer readings, which may not always be performed reliably or consistently, potentially leading to a delayed or missed filter replacement. Also, scheduled-interval filter maintenance assumes common driving conditions and habits, when in fact variable terrain, shifting frequency, shift efficiency, traffic conditions, and other environmental and operating factors combine to make the actual useful life of a particular transmission filter unique to that vehicle and/or operator.

SUMMARY OF THE INVENTION

Accordingly, a vehicle is provided having a transmission, a filter for filtering a supply of transmission fluid, at least one sensor for determining an operating condition or event of the transmission, and a controller. The controller has an algorithm for predicting a remaining useful life of the filter based on a detected operating event of the transmission.

In one aspect of the invention, the operating event is a completed shift event or a zero output speed event of the transmission.

In another aspect of the invention, the controller updates an accumulated distance of the vehicle and an accumulated operating time of the transmission in response to the detected operating event.

In another aspect of the invention, a shift sensor determines a shift signal corresponding to the completed shift event, and a speed sensor detects an output speed of the transmission.

In another aspect of the invention, the shift sensor includes an algorithm that compares a detected speed ratio of the transmission to a stored threshold speed ratio for determining the completed shift event.

In another aspect of the invention, the controller includes a first lookup table describing a distance limit of the filter and a second lookup table describing a time limit of the filter, the controller being operable for accessing the lookup tables for predicting the remaining useful life of the filter.

In another aspect of the invention, a service indicator alerts an operator of the vehicle when the predicted remaining useful life falls below a threshold.

In another aspect of the invention, a method is provided for determining the remaining useful life of a transmission filter in a vehicle. The method includes detecting the presence of a predetermined transmission operating event, incrementing a stored value for one of an accumulated distance variable and an accumulated time variable using the detected predetermined transmission operating event, and predicting the remaining useful time of the transmission filter in response to the accumulated time and accumulated distance variables.

In another aspect of the invention, the predetermined transmission operating event is a completed shift event or a zero output speed event of the transmission.

In another aspect of the invention, predicting the remaining useful life of the transmission filter includes comparing the accumulated distance to a threshold distance, and determining the remaining useful time includes comparing the accumulated time to a threshold time.

In another aspect of the invention, the method includes calculating the accumulated distance in part by dividing a recorded accumulated distance value by a ratio of an output speed of the transmission to an actual speed of the vehicle.

In another aspect of the invention, the method includes activating a service indicator when one of the accumulated distance and accumulated time exceeds a corresponding threshold.

In another aspect of the invention, a method for determining the remaining useful life of a transmission filter in a vehicle includes detecting a completed shift event of the transmission, updating a stored value for an accumulated distance and an accumulated time in response to the completed shift event, and referencing a pair of lookup tables to determine the remaining useful time and distance of the transmission filter based on a respective one of the accumulated time and distance.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
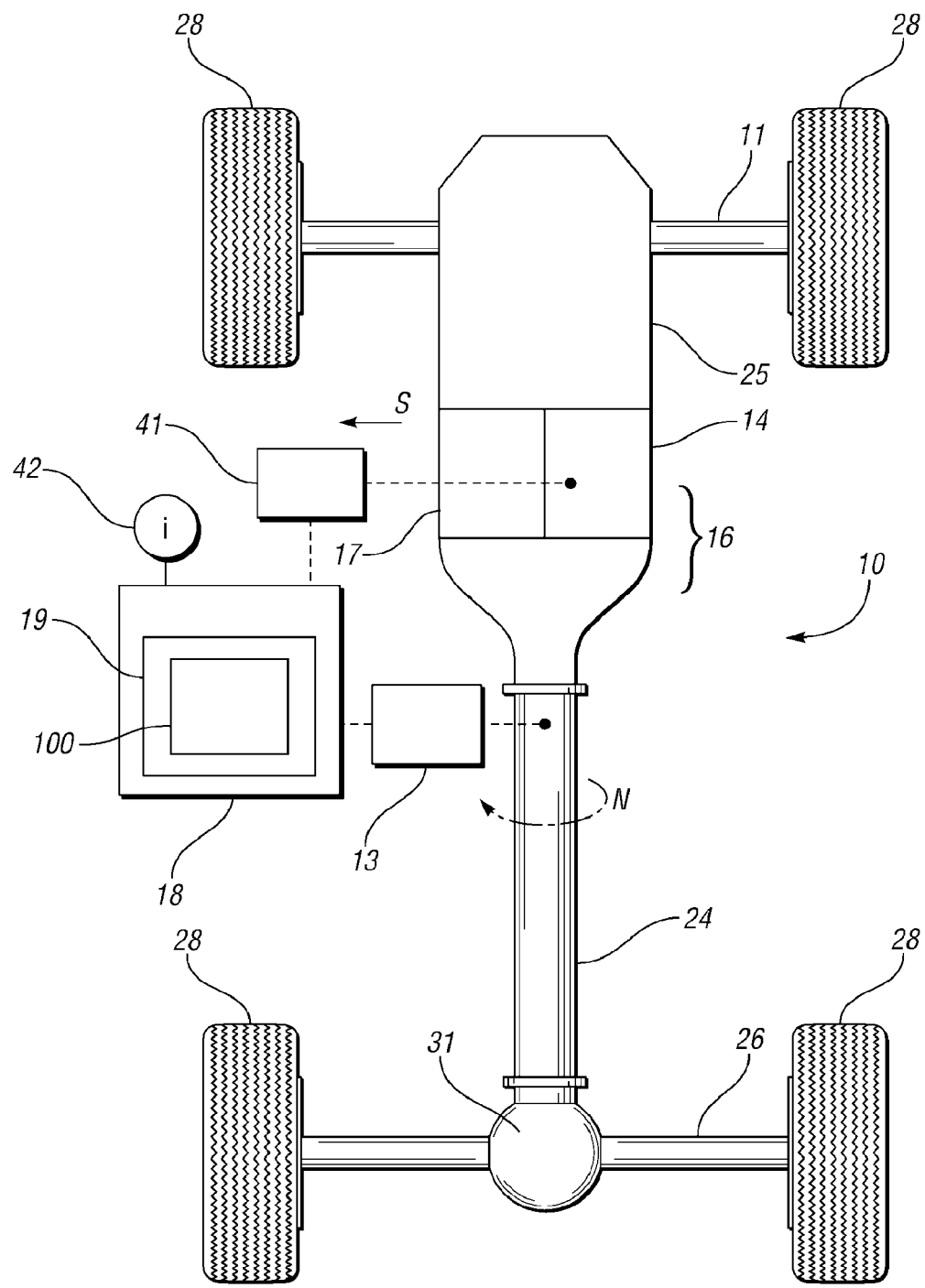
FIG. 1 is a schematic representation of a vehicle having a transmission filter, a controller, and algorithm for determining the remaining useful life of the transmission filter.

Referring to the drawings wherein like reference numbers correspond to like or similar components throughout the several figures, and beginning with FIG. 1, a vehicle 10 has an engine 25 in driving connection with a transmission 16. The engine 25 is selectively connectable to transmission 16 through an automatically or manually shiftable gear set 14, which is suitable for shifting or selecting between the various available gear settings of the transmission 16. The transmission 16 includes a transmission filter 17 suitable for filtering a supply of transmission fluid (not shown). The filter 17 may be constructed at least partially of composite material, sintered metal and/or plastic, or other filter media suitable for efficiently filtering the supply of transmission fluid (not shown) across a range of operating temperatures of the transmission 16. Such filter media may be pleated to further increase the amount of available surface area within the filter 17, thus potentially increasing the useful life of the filter 17.

The transmission 16 delivers a detectable transmission output speed (N) to a rotatable output member 24, such as a driveshaft or transmission output shaft, with the transmission output speed (N) being directly or indirectly detectable, measurable, or otherwise determinable by one or more speed sensors 13 attached directly to or in proximity to the output member 24. The output member 24 may be operatively connected to a rear differential 31 configured to distribute rotational force or torque from output member 24 to a rear drive axle 26 to thereby propel or drive a plurality of wheels 28. Although not shown in FIG. 1, the vehicle 10 may also or alternately include a substantially similar front differential suitable for distributing torque to a front drive axle 11 for powering or driving a plurality of wheels 28 as shown, such as in a front-wheel, four-wheel, or all-wheel drive configuration. As will be understood by those of ordinary skill in the art, the vehicle 10 has an actual vehicle speed (V) that may differ from transmission output speed (N) depending on, for example, the particular axle ratio and/or the diameter of each of the wheels 28 of the vehicle 10.

The vehicle 10 includes an integrated control unit or controller 18 having a sufficient amount of programmable memory 19. The controller 18 is configured or programmed to control various electrical and electromechanical operations within the vehicle 10, such as the shift cycles of the gear set 14, and further includes a control method or algorithm 100 for determining or predicting the remaining useful life of the filter 17, as will be discussed in detail later hereinbelow. A service indicator 42, abbreviated "i" in FIG. 1, is electrically connected to the controller 18 and visibly and/or audibly displays or presents one or more service warnings or other service messages, as will be described later hereinbelow.

A shift sensor 41 is operable for detecting a shift signal, represented by the arrow S, corresponding to a completed gear shift or shifting event within the gear set 14. Alternatively, and particularly when the transmission 16 is an automatic transmission, the shift sensor 41 may take the form of a control algorithm for the transmission 16, i.e. as a "virtual" sensor that is programmed or stored in memory 19 of the controller 18, as discussed hereinabove, and not embodied by a physical sensing device or mechanism. A shift sensor 41 of this type may, for example, take the ratio of input speed (not shown) to output speed (N) of the transmission 16, and compare the resultant speed ratio to known speed ratio values that are indicative of a completed shift event. The output of shift sensor 41, whatever its form, and of the speed sensor or sensors 13 are preferably communicated with the controller 18 via data link, such as the Society of Automotive Engineers (SAE) Standard J1850 and/or J1939, and/or via direct/hard wiring or other suitable communication link or connection.

The method or algorithm 100 of the invention, which will be discussed below with reference to FIG. 2, determines or predicts the remaining useful life of the filter 17. The algorithm 100 uses the shift signal (arrow S) as measured, calculated, or detected by the shift sensor 41 or by the controller 18, as described above, and the transmission output speed (N) as measured or detected by the speed sensor 13, as a pair of input values into a series of calculations for determining the remaining useful life of the filter 17.

Figure 2:
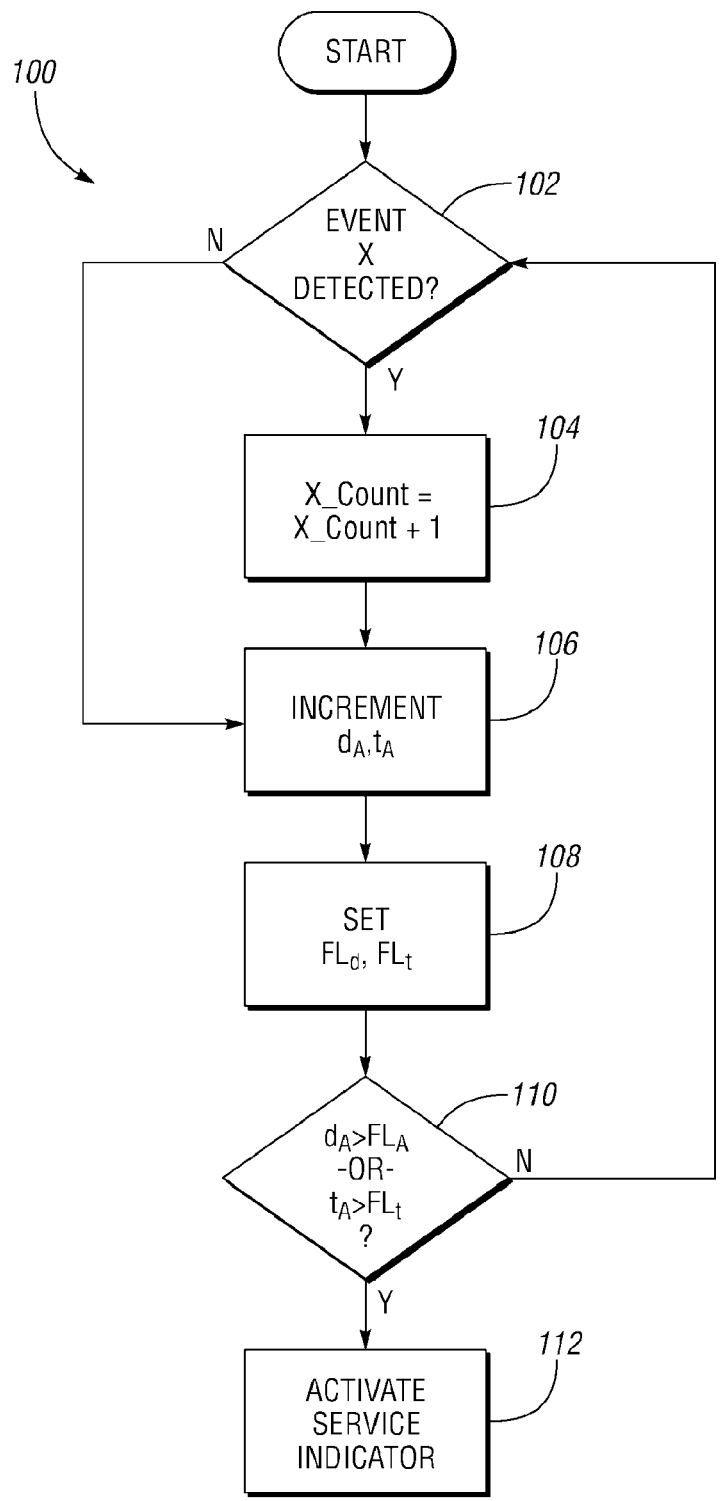
FIG. 2 is a flow chart describing the method or algorithm of the invention.

Referring to FIG. 2, the algorithm 100 begins with step 102, in which the controller 18 determines whether a predetermined transmission operating event, abbreviated "event X" has been newly completed. Event X is any suitable discrete, detectable, and predetermined transmission operating event marking a passage of operating time of the vehicle 10. In one embodiment, the event X may be a completed shift event of the gear set 14 (see FIG. 1), as detected or measured by the shift sensor 41. Alternately, the event X may be a zero transmission output speed event, i.e. a transmission output speed (N)(see FIG. 1) equaling approximately zero, as detected or measured by the speed sensor 13 (see FIG. 1). Other discrete events may be used within the scope of the invention, provided the selected event sufficiently marks a passage of operating time of the vehicle 10. If the algorithm 100 detects a completed event X, it proceeds to step 104. Otherwise, the algorithm 100 proceeds directly to step 106.

At step 104, the algorithm 100 increments a variable "X_Count", which may be embodied as an integer counter stored or programmed within memory 19 of the controller 18 (see FIG. 1) or another suitable counter. Once the variable "X_Count" has been properly incremented, the algorithm 100 proceeds to step 106.

At step 106, the algorithm 100 performs a calculation that adjusts two more recorded or stored variables corresponding to the accumulated distance of the vehicle 10 (see FIG. 1) and the accumulated operating time of the vehicle 10. In FIG. 2, the accumulated distance is abbreviated as "$d_A$", and likewise, the accumulated time is abbreviated "$t_A$". To adjust the variable "$d_A$", the algorithm 100 performs a stored or programmed equation suitable for incrementing an "accumulated miles" value stored or recorded in memory 19. The accumulated distance ($d_A$) may be programmed in miles, for example when the vehicle 10 is to be operated in the United States, but may also be programmed in kilometers or other suitable units of distance as required. In one embodiment, the equation performed at step 106 is $d_{A(new)}=d_A+[N/3600]*[dt/(N/V)]$, where (dt) equals the time increment, and the ratio (N/V) equals the ratio of the transmission output speed (N) in revolutions-per-minute to the actual vehicle speed (V) described previously hereinabove.

The ratio N/V may be estimated, or alternately may be predetermined based on the known axle ratio and/or the diameter of the wheels 28 of the vehicle 10 (see FIG. 1), and programmed into memory 19. Optionally, the controller 18 may be reprogrammed by an operator or maintainer of the vehicle 10, for example to allow for after-market tires having a different diameter than was originally specified by the manufacturer. Likewise, to adjust the accumulated time variable ($t_A$), the algorithm 100 performs a stored or programmed equation suitable for incrementing a stored value for ($t_A$) value in memory 19. In one embodiment, the equation calculates "time" in hours, and the equation is $t_A=t_A+dt/3600$. After performing the two calculations described hereinabove, the algorithm 100 proceeds to step 108.

At step 108, the algorithm 100 accesses a pair of lookup tables that are stored or programmed in memory 19 of the controller 18, and retrieves the data stored at a corresponding position in each of tables. The first lookup table describes the filter life distance limit of the filter 17 (see FIG. 1), denoted in miles or kilometers, and which is abbreviated in FIG. 2 as "$FL_d$". The second lookup table described the filter life time limit of the filter 17 (see FIG. 1), which is preferably denoted in hours, and which is abbreviated in FIG. 2 as "$FL_t$". The algorithm 100 then selects or retrieves the corresponding data values from each table for the predetermined event counter variable "X_Count" previously stored or recorded at step 104, and the value for accumulated distance ($d_A$) and accumulated time ($t_A$), previously stored or recorded at step 106. The lookup tables may be populated with the remaining distance data and remaining time data corresponding to the quantity "X_Count/$d_A$" and "X_Count/$t_A$", respectively. After setting the filter life distance and time limit values of the variables $FL_d$ and $FL_t$, respectively, the algorithm 100 proceeds to step 110.

At step 110, the algorithm 100 determines whether one of the stored values for accumulated distance ($d_A$) or accumulated time ($t_A$) (see step 106) exceeds the respective stored filter life distance and time limits ($FL_d$, $FL_t$) (see step 108). If one of the stored accumulated values ($d_A$, $t_A$) exceeds the respective stored filter life distance and time limits ($FL_d$, $FL_t$), the algorithm 100 proceeds to step 112. Otherwise, algorithm 100 returns to step 102 and repeats that step, as described hereinabove. As will be apparent to those of ordinary skill in the art, steps 106-110 are performed in a continuous manner regardless of the results of step 102 in order to ensure that the accumulated distance ($d_A$) and the accumulated time ($t_A$) values are continuously updated, thereby ensuring the accuracy of the accumulated distance and time values $d_A$ and $t_A$.

At step 112, the algorithm 100 activates or illuminates the service indicator 42 (see FIG. 1) to alert an operator of the vehicle 10 (see FIG. 1) that service of the transmission filter 17 (see FIG. 1) is required. The service indicator 42 may be embodied as an indicator lamp, a light, a message, text, and/or another visual display presented on a gauge or display screen (not shown) within the vehicle 10 (see FIG. 1), and may be coupled with an audible alarm. Preferably, an operator or maintainer of the vehicle 10 may clear or reset the service indicator 42 if desired, such as by using an accessible input device or a "clear/reset" button that is positioned in proximity to the service indicator 42, or by using a service tool for accessing memory 19. Similarly, because the determined or predicted remaining filter life data is stored in memory 19 by the algorithm 100, an operator or maintainer may easily monitor the stored data. For example, an operator may monitor the percentage and/or hours of remaining life of the filter 17 by viewing or accessing a J1939 parameter, described previously hereinabove, and/or by configuring the controller 18 to present or display the stored data when the "clear/reset" button (not shown) is depressed, or by using a service tool.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a transmission having an output member with a detectable output speed;
a filter operable for filtering a supply of transmission fluid;
at least one sensor adapted for determining an operating event of said transmission; and
a controller having an algorithm for predicting a remaining useful life of said filter;
wherein said algorithm predicts said remaining useful life of said filter in response to said operating event, and said operating event is selected from a group consisting of a completed shift event of said transmission and a zero output speed event of said transmission.

2. The vehicle of claim 1, wherein said controller is operable for updating an accumulated distance of the vehicle and an accumulated operating time of said transmission in response to said operating event.

3. The vehicle of claim 1, wherein said at least one sensor includes a shift sensor configured for determining a shift signal corresponding to said completed shift event, and a speed sensor configured for detecting an output speed of said transmission.

4. The vehicle of claim 3, wherein said at least one shift sensor is a portion of said controller that is operable for comparing a detected speed ratio of said transmission to a stored threshold speed ratio for determining said completed shift event.

5. The vehicle of claim 1, wherein said controller includes a pair of lookup tables, including a first lookup table describing a distance limit of said filter and a second lookup table describing a time limit of said filter, said controller being operable for accessing said pair of lookup tables for predicting said remaining useful life of said filter.

6. The vehicle of claim 1, further comprising a service indicator that is configured for alerting an operator of the vehicle when said remaining useful life drops below a threshold value.

7. A method for determining the remaining useful life of a transmission filter in a vehicle, the method including:
detecting the presence of an operating event of a transmission;
incrementing a stored value for one of an accumulated distance variable and an accumulated time variable in response to a detected presence of said operating event; and
predicting the remaining useful time of the transmission filter in response to said accumulated time variable and said accumulated distance variable;
wherein said operating event is selected from a group consisting of a completed shift event of the transmission and a zero output speed event of the transmission.

8. The method of claim 7, wherein said predicting the remaining useful life of the transmission filter includes comparing a value of said accumulated distance variable to a threshold distance, and wherein said determining the remaining useful time includes comparing a value of said accumulated time variable to a threshold time.

9. The method of claim 7, further comprising calculating said accumulated distance in part by dividing a recorded accumulated distance value by a ratio of an output speed of the transmission to an actual vehicle speed.

10. The method of claim 8, wherein said threshold distance and said threshold time are selected from a pair of lookup tables.

11. The method of claim 7, further comprising activating a service indicator when a value of one of said accumulated distance variable and said accumulated time variable exceeds a corresponding one of said threshold distance and threshold time.

* * * * *